United States Patent
Vivek et al.

(10) Patent No.: US 11,084,122 B2
(45) Date of Patent: Aug. 10, 2021

(54) JOINING OF DISSIMILAR MATERIALS USING IMPACT WELDING

(71) Applicant: Ohio State Innovation Foundation, Columbus, OH (US)

(72) Inventors: Anupam Vivek, Columbus, OH (US); Glenn Daehn, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 277 days.

(21) Appl. No.: 16/035,399

(22) Filed: Jul. 13, 2018

(65) Prior Publication Data
US 2019/0015925 A1 Jan. 17, 2019

Related U.S. Application Data

(60) Provisional application No. 62/532,336, filed on Jul. 13, 2017.

(51) Int. Cl.
*B23K 20/16* (2006.01)
*B23K 20/22* (2006.01)
*B23K 103/18* (2006.01)

(52) U.S. Cl.
CPC ............ *B23K 20/16* (2013.01); *B23K 20/165* (2013.01); *B23K 20/22* (2013.01); *B23K 2103/18* (2018.08)

(58) Field of Classification Search
None
See application file for complete search history.

(56) References Cited

U.S. PATENT DOCUMENTS

| | | | | | |
|---|---|---|---|---|---|
| 3,261,088 A | * | 7/1966 | Holtzman | .............. | B23K 20/08 228/108 |
| 3,614,827 A | * | 10/1971 | Knop | ..................... | B23K 20/08 228/107 |

(Continued)

FOREIGN PATENT DOCUMENTS

| | | |
|---|---|---|
| CN | 101423071 A | 5/2009 |
| CN | 102029317 A | 4/2011 |

(Continued)

OTHER PUBLICATIONS

Manikandan et al. "Explosive welding of titanium/304 stainless steel", Journal of Materials Processing Technology, 2008, issue 195, p. 232-240 (Year: 2008).*

(Continued)

*Primary Examiner* — Devang R Patel
(74) *Attorney, Agent, or Firm* — Standley Law Group LLP

(57) ABSTRACT

A system and method for joining dissimilar metals. In one embodiment, a method comprises providing a first metal plate, a second metal plate, and an intermediate body that is positioned between the first metal plate and the second metal plate. The first metal plate is then driven into the intermediate body, which causes at least a portion of the intermediate body to collide with the second metal plate. As a result, the material of the intermediate body joins the first metal plate to the second plate. In another embodiment, a method for joining dissimilar metals comprises providing a first metal that is not amenable to welding, a second metal that is joinable to the first metal, and an intermediate body that is not joinable to at least the first metal. The intermediate body may have at least one hole such that the first metal and the second metal are positioned over and on opposite sides (Continued)

of the hole(s). At least a portion of the second metal may then be driven into the hole(s) to be joined to first metal.

3 Claims, 3 Drawing Sheets

(56) References Cited

U.S. PATENT DOCUMENTS

| | | | |
|---|---|---|---|
| 3,640,110 A | | 2/1972 | Inoue |
| 3,727,296 A | * | 4/1973 | Cranston .............. B23K 20/085 228/108 |
| 3,737,976 A | * | 6/1973 | Lieberman ............ B23K 20/08 228/109 |
| 3,744,119 A | * | 7/1973 | Hanson ................ B23K 20/085 228/109 |
| 3,813,758 A | | 6/1974 | Araki |
| 4,008,845 A | * | 2/1977 | Bleckmann ........ B23K 20/2333 228/136 |
| 4,231,506 A | | 11/1980 | Istvanffy et al. |
| 4,485,960 A | * | 12/1984 | Sagan ..................... B23K 9/23 228/107 |
| 4,746,054 A | | 5/1988 | Moats et al. |
| 4,756,464 A | * | 7/1988 | Hardwick .............. B23K 20/08 228/107 |
| 4,881,314 A | * | 11/1989 | Gupta .................... B23K 20/08 29/421.2 |
| 5,025,971 A | * | 6/1991 | Schafer .................. B25C 1/047 227/156 |
| 5,226,579 A | * | 7/1993 | Bergmann ............ B23K 20/08 219/78.02 |
| 5,242,098 A | * | 9/1993 | Hardwick .............. B23K 20/18 228/107 |
| 5,874,178 A | * | 2/1999 | Takayasu ............. B23K 35/005 428/681 |
| 5,961,027 A | * | 10/1999 | Szecket ................. B23K 20/08 228/107 |
| 6,098,548 A | | 8/2000 | Rink et al. |
| 7,253,374 B2 | * | 8/2007 | Schmidt ............... B23K 9/0026 219/117.1 |
| 7,516,634 B1 | | 4/2009 | Golovashchenko et al. |
| 9,021,845 B2 | | 5/2015 | Vivek et al. |
| 2004/0170860 A1 | * | 9/2004 | Hardwick ............ B23K 35/004 428/660 |
| 2009/0098404 A1 | | 4/2009 | Matsuyama |
| 2010/0108253 A1 | | 5/2010 | Doane et al. |
| 2011/0000953 A1 | | 1/2011 | Daehn et al. |
| 2013/0283878 A1 | * | 10/2013 | Vivek ..................... B21D 26/10 72/60 |
| 2014/0112709 A1 | * | 4/2014 | Okauchi ............... B65D 90/08 403/271 |
| 2014/0294489 A1 | * | 10/2014 | Sakai ..................... B23K 11/20 403/267 |
| 2015/0024160 A1 | * | 1/2015 | Georgeson ................ B32B 3/06 428/60 |
| 2015/0336153 A1 | * | 11/2015 | Vivek ..................... B23K 20/08 72/60 |
| 2016/0008883 A1 | | 1/2016 | Vivek et al. |

FOREIGN PATENT DOCUMENTS

| | | |
|---|---|---|
| EP | 0160855 A1 | 11/1985 |
| GB | 1233311 A | 5/1971 |
| JP | 42-008460 | 4/1967 |
| JP | 47-032110 | 8/1972 |
| JP | 49-003113 | 1/1974 |
| JP | 53-49294 | 4/1983 |
| JP | 2008307592 A | 12/2008 |
| RU | 2121410 C1 | 11/1998 |
| RU | 80371 U1 | 2/2009 |
| SU | 1722686 A2 | 3/1992 |
| UA | 42489 U | 7/2009 |
| WO | 9965636 A1 | 12/1999 |

OTHER PUBLICATIONS

Vivek, A. et al., Vaporizing Foil Actuator Used for Impulse Forming and Embossing of Titanium and Aluminum Alloys, Journal of Materials Processing Technology, vol. 214, No. 4, pp. 865-875, Dec. 15, 2013.

Woodward, S. Springback Callibration of Sheet Metal Components Using Impulse Forming Methods, Thesis, Ohio State University, 2011.

Vivek, A., et al., Electrically Driven Plasma via Vaporization of Metallic Conductors: A Tool for Impulse Metal Working, Journal of Materials Processing Technology, Feb. 2, 2013.

* cited by examiner

US 11,084,122 B2

JOINING OF DISSIMILAR MATERIALS USING IMPACT WELDING

This application claims the priority benefit of U.S. Provisional Application No. 62/532,336, filed Jul. 13, 2017, which is hereby incorporated by reference in its entirety.

BACKGROUND AND SUMMARY OF THE INVENTION

Exemplary embodiments of the present invention relate to the field of impulse metalworking. Specifically, new devices and methods for impact-driven joining are described that allow dissimilar materials to be joined. Other aspects and advantages of the present invention will be apparent from the descriptions and drawings of exemplary embodiments.

When a sheet of metal is accelerated to very high speed and an obstacle is placed in its path, then because of its inertia, it would conform into or around that obstacle. Hence the sheet forms into a certain shape if the obstacle is in the form of a female die, or shears if the obstacle is a sharp edge. It is also well known that collision of a fast travelling piece of metal with another can lead to a weld, if the impact velocity and angle are in an optimum range. Collision welds are generally observed when the impact velocity is in the range of 150 m/s to 500 m/s and the impact angle is between 5 to 20 degrees.

Impulse metalworking has some distinct advantages over traditional quasi-static methods. Impulse forming leads to lower spring back, higher formability and can be implemented with single sided tooling. Impact welding has been shown to result in welds which are stronger than the parent materials. It is a solid state welding process with little or no heat affected zone because of which brittle intermetallics do not form. This process is widely used for joining dissimilar metals which are very difficult, sometimes impossible, to join by traditional fusion welding processes. The two most common agents for driving the metallic workpiece to high velocities are electromagnetic forces and explosives.

The electromagnetic launch of the workpiece is based on laws of electromagnetic induction and Lorentz forces. When a conductor, considered as a secondary coil, is placed in proximity to another conductor, considered as a primary coil, carrying a transient current, then a current opposing the change in magnetic field is induced in the former. These conductors carrying opposite currents repel each other and hence the workpiece gets accelerated to a high velocity. The primary coil is generally insulated from the workpiece by encapsulating it in an epoxy matrix. If the cycle times are low, the joule heat developed during the process can melt the epoxy material, leading to current shortage. There are also pressure limitations on the primary coil which depend on the mechanical strength of the epoxy as well as the coil material. Hence, the application of electromagnetic forming is limited at high energies and large numbers of operations by the availability of long-lived electromagnetic coils. In addition, the workpiece either has to be electrically conductive, or it has to be driven by a conductive flyer.

Use of explosives for forming or welding has problems of its own. Their safe implementation in closed industrial settings is difficult. Also, they are mostly used for only large scale applications, and there is a high expenditure on infrastructure. Also, there are government and OSHA regulations which limit the use of explosives.

With the proliferation of small electronic devices, it is often necessary to join surfaces that are too thin or too sensitive to heat for conventional means of metal-joining or welding. One example of this is a mobile communications device.

It is therefore an unmet goal of the prior art to provide a reliable method of joining components, especially when there are dissimilar metals or non-metallic composites involved and/or thin or sensitive materials involved.

At least one of these unmet goals may be met by the exemplary methods and devices described in more detail below. In one exemplary embodiment, a method for joining dissimilar metals comprises providing a first metal plate, a second metal plate, and an intermediate body that is positioned between the first metal plate and the second metal plate. The intermediate body may be comprised of a material that is amenable to be joined to the first metal and the second metal. The first metal plate is then driven into the intermediate body, which causes at least a portion of the intermediate body to collide with the second metal plate. As a result of the collision, the material of the intermediate body joins the first metal plate to the second plate.

In another exemplary embodiment, a method for joining dissimilar metals comprises providing a first metal that is not amenable to welding, a second metal that is compatible to be joined to the first metal, and an intermediate body that is not amenable to being joined to at least the first metal. In this example, the intermediate body may have at least one hole such that the first metal and the second metal are positioned on opposite sides of the intermediate body and over the at least one hole. At least a portion of the second metal may then be driven into the hole(s) such that the second metal is joined to the first metal.

In addition to the novel features and advantages mentioned above, other benefits will be readily apparent from the following descriptions of the drawings and exemplary embodiments.

BRIEF DESCRIPTION OF THE DRAWINGS

A better understanding of the invention will be had when reference is made to the accompanying drawings, wherein identical parts are identified by identical reference numerals and wherein.

DETAILED DESCRIPTION OF EXEMPLARY EMBODIMENT(S)

Figure 1:
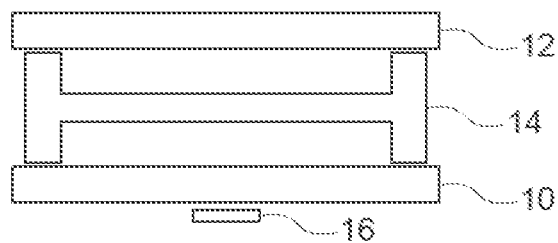
FIG. 1 is a schematic of an exemplary embodiment of a vaporizing foil actuator system.

U.S. Pat. No. 9,021,845 describes the technique of rapidly vaporizing a consumable body, especially of metal, to cause a piece of metal, generally referred to as the flyer, to accelerate and collide with a target, resulting in a joining of the respective pieces.

In many embodiments of a system and method of the present invention, the consumable body may comprise a metal foil, although many other forms of metal, such as wire, mesh, etc., are deemed useful for this purpose.

In one embodiment of a system and method, the stationary body may be a die, such that a piece of sheet metal may be deformed by the collision to create a desired shape or surface structure. In another embodiment of the method, the stationary body may be a die that contains holes, such that the piece of sheet metal may be perforated or sheared by the collision to create a desired hole or series of holes.

In a yet another embodiment of a system and method, the stationary body may be a further piece of metal, such that the piece of sheet metal may be welded thereto by the collision. In this type of embodiment, the piece of sheet metal and the further piece of metal may be dissimilar metals. Also, the further piece of metal need not be stationary. In some situations, using two vaporizing foils to accelerate the respective pieces of metal into a collision with each other may create better welds than if one piece is stationary. This "dual acceleration" technique may be more difficult to implement than a single foil method, but may provide sufficient advantage in the correct circumstance.

In any of these systems or methods, the piece of sheet metal may attain a velocity of at least about 200 m/s, although the velocity window for achieving impact welding may be quite large and velocities in the range of 2000 m/s during the accelerating step may be possible.

In many embodiments, aluminum, as well as its alloys, may be the metal foil in the consumable body.

When preparing the consumable body, some embodiments may further comprise a layer of an unstable energetic chemical mixture. This may be, for example, an oxidizer fuel mixture or an unstable compound such as nitromethane. One exemplary unstable energetic chemical mixture may comprise kerosene oil and potassium chlorate. It is also possible in some situations to add a layer of a polyurethane elastomer to the consumable body, preferably on a face that is directed towards the piece of sheet metal to be accelerated. Such a polyurethane layer may be used with or without the unstable energetic chemical mixture.

In other embodiments, the consumable body may comprise two layers of metal foil or mesh, with an intermediate layer of the unstable energetic chemical mixture.

In an exemplary embodiment, the vaporizing of the consumable body may be achieved by passing a high current rapidly into the foil, particularly by discharging a capacitor or a bank of capacitors.

In many of these methods, the consumable body, the piece of sheet metal and the stationary body may be arranged in that order between a pair of blocks of metal, each of which may significantly outweigh the piece of sheet metal, thereby directing the vaporized stream towards the piece of sheet metal and accelerating the piece of sheet metal towards the stationary body. In some exemplary embodiments, a target sheet may be backed (e.g., immediately backed) by a layer of material that may serve as a dampener during the impact process. One example of a dampener layer may be comprised of a thin layer of a relatively soft material that has low stiffness and density.

Turning now to an example of a specific application, there are situations where two dissimilar metals are to be joined. By using a vaporizing foil actuator in combination with an intermediate body that is especially selected and shaped for the application, 100% joint efficiency has been demonstrated. Of course, it will be clear to one of skill that the technique described may be used in many situations when the metals are similar, but the joining of similar metals may also be accomplished by methods that are not applicable to dissimilar metals, so all mention here is to "dissimilar" metals.

In an example of the technique, one of the dissimilar metals is selected to be the flyer plate and the other to be the target. A gap between the two sheets may be created by preforming or pre-machining one or both of the sheets or inserting one or more standoff bodies (e.g., sheets, washers, etc.) between the sheets of dissimilar metal. Size, shape, and material may all be factors to be considered in making the selection. FIG. 1, as an example, shows a top plan view of two sheets 10, 12, of dissimilar metals, with sheet 12 designated as the target plate and sheet 10 designated as the flyer plate. In other exemplary embodiments, as aforementioned, the metals may be similar.

At this point, the intermediate body 14 can be determined. In this embodiment, since the action of a vaporizing foil actuator 16 onto flyer plate 10 is to drive a portion of the flyer plate into the intermediate body 14, and, as a result of this primary collision, to accelerate at least a portion of the intermediate body into the target plate 12, the intermediate body needs to be a material that is amenable to being joined to each of the dissimilar metals, even though the dissimilar metals may not be amenable to direct bonding to each other.

Beyond selection of the material for intermediate body 14, it is also believed to be important to consider the shape thereof. One example of a preferred intermediate body 14, as presently understood, is a three-dimensional body, shaped to facilitate the movement of metal within the intermediate body 14, initiated by the vaporizing foil actuator in a manner that allows the overall thickness of the intermediate body to be reduced by the bonding process.

Figure 2:
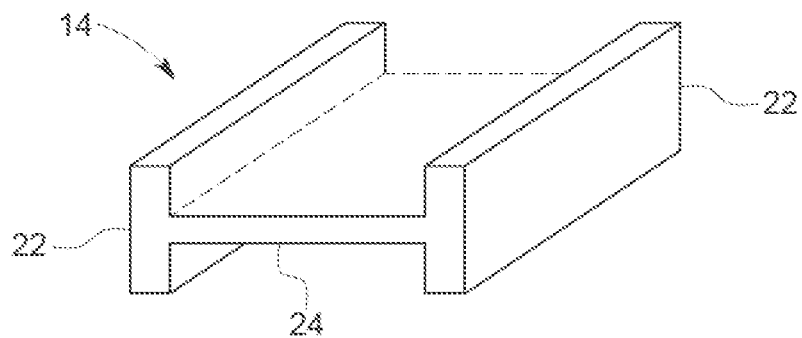
FIG. 2 is a perspective view of the exemplary embodiment of the intermediate body of the vaporizing foil actuation system shown in FIG. 1.

A first example of such an intermediate body 14 is shown in FIGS. 1 and 2, where the intermediate body is seen in elevation and perspective views, respectively. In this embodiment, the intermediate body 14 has an "H" shape profile in the thickness dimension. The upright arms 22 of the "H" provide spacing between the flyer plate 10 and the target plate 12. The crossbar 24 that joins the upright arms 22 provides an intermediate plate that is impacted, preferably towards a central portion, by the flyer plate 10. This results in the crossbar portion being driven in turn into the target plate 12.

A variation of this concept may be to use an intermediate body with an "X" shaped profile. This shape may provide the advantage of starting the process of reducing the thickness of the body, or, stated slightly differently, moving the flyer and target plates into closer proximity. A possible disadvantage of this shape in some circumstances is that it may cause more distortion of the flyer and target plates, and it also may not provide an adequate target into which the accelerated flyer plate may collide.

Figure 3:
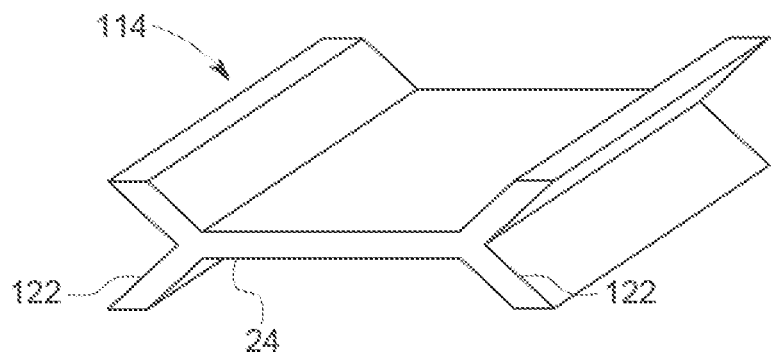
FIG. 3 is a perspective view of a second exemplary embodiment of an intermediate body that may be used in a vaporizing foil actuation system.

Building on this concept, a variation of the intermediate body 114 is shown in a perspective view in FIG. 3. In this embodiment, which is a hybrid between the "H" profile of FIG. 2 and an "X" profile that lacks a crossbar, a pair of bent upright arms 122 are joined with a crossbar 24, so that the upright arms intersect the crossbar at an obtuse angle, rather than at a right angle. As such, upright arms 122 may be considered to form a V shape in this embodiment. This combination of crossbar 24 with upright arms 122 carries forward the impact area of the crossbar, whereas the bent upright arms facilitate the compression of the intermediate body 114 in the direction of the impact.

In any of the foregoing examples, a rectangular (and probably preferably square) profile is provided to the target and flyer plates, that is, normal to those plates.

Figure 4:
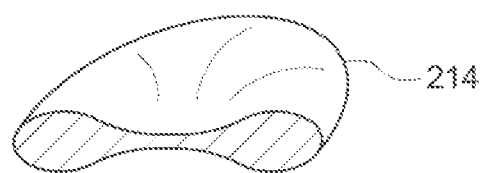
FIG. 4 is a perspective, partial section view of a third exemplary embodiment of an intermediate body that may be used in a vaporizing foil actuation system.
Figure 5:
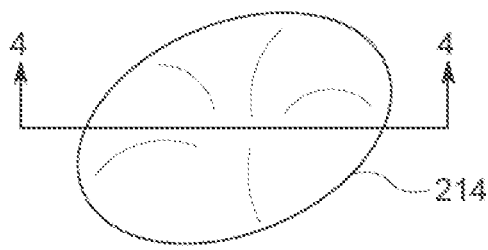
FIG. 5 is a top perspective view of the intermediate body of FIG. 4, which indicates a cross-section line 4-4.

A further variation may be to change the rectangular profile into a circular profile. In some embodiments, a disc with uniform thickness may not provide the requisite spacing. In other embodiments, a torus, with an open center, may lack the desired mass to be driven forward by the flyer plate into the target plate. As a result, it may be preferred to have a disc 214, such as is shown in a perspective, partial section view in FIG. 4 and in a top perspective view in FIG. 5. The intermediate body 214 has at least a minimum thickness across its diameter, but, moving from a central axis outwardly, the thickness may increase and then decrease, preferably in a smooth manner. Such a body 214 may be expected to expand in diameter, displacing metal outwardly during the joining process.

In another exemplary method of using vaporizing foil actuation to join dissimilar materials, one of the materials may be a material that is not even subject to welding. An example may be a sheet of a carbon fiber composite, which cannot be joined to a metal by welding.

Figure 6:
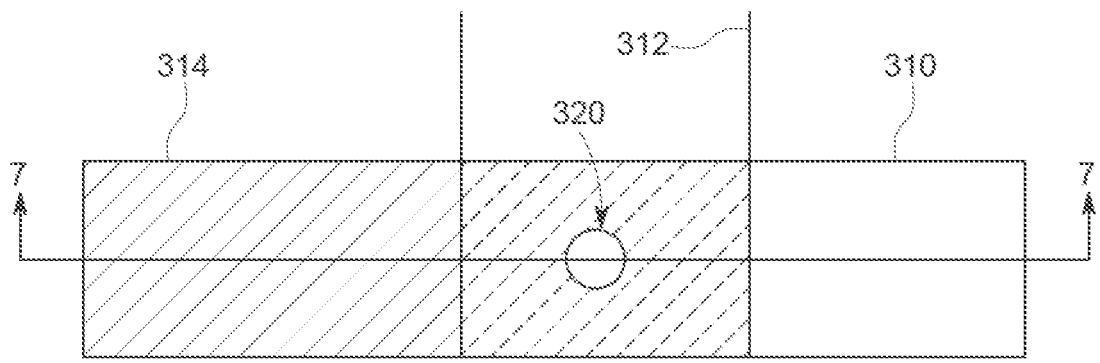
FIG. 6 is a schematic of an exemplary embodiment of a vaporizing foil actuation system comprising an intermediate body that has a hole to facilitate welding, which indicates a cross-section line 7-7, wherein the intermediate body may not be amenable to welding (a vaporizing foil actuator is not shown for clarity)
Figure 7:
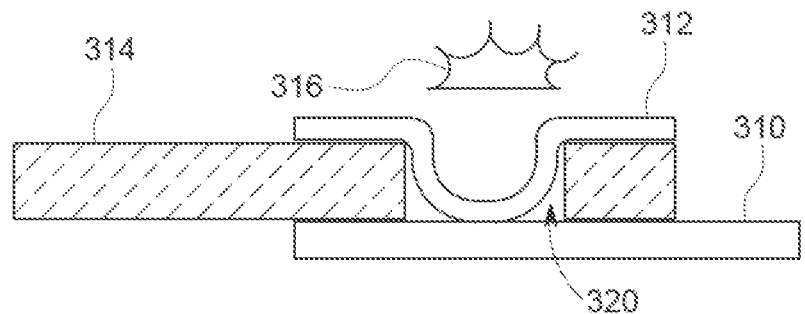
FIG. 7 is a cross-sectional schematic of the vaporizing foil actuation system of FIG. 6 (showing a vaporizing foil actuator)

Such as shown in the example of FIGS. 6 and 7, one way of practicing this method is to provide a first metal sheet 310, the sheet that is to be joined, but which may not be amenable to welding, and a second metal sheet 312, which is compatible to being joined to the first metal sheet 310. For purposes of the description, the sheet 314 which is not amenable to welding will be referred to as the non-weldable sheet. It could, however, also be a metal sheet of a material that is not compatible for welding onto the first metal sheet 310. Other types of material that are not subject to welding may also be used. In an exemplary embodiment, one or more holes 320 may be made, by drilling or other technique suitable to the material, in the non-weldable sheet 314, preferably near, but spaced away from, a margin or edge where the sheet 312 is to be joined to the first metal sheet 310. Preferably, the non-weldable sheet 314 and the first metal sheet 310 are held in place relative to each other, with a portion of the first metal sheet 310 overlying or covering each of the one or more holes 320 in the non-weldable sheet 314. In an exemplary embodiment, the first metal sheet 310 may be arranged such that the area where the sheet 310 overlies the one or more holes 320 in the non-weldable sheet 314 is also near but spaced away from a margin or edge where the first metal sheet 310 is to be joined to the sheet 312. In another exemplary embodiment, it will also be recognized that the one or more holes 320 may be in, and overlap an edge of, the non-weldable sheet 314, so that the two metal sheets 310, 312 may be joined through the hole or holes in a manner that traps the non-weldable sheet in place.

The second metal sheet 312 is also positioned to overlie or cover at least one of the one or more holes 320 in the non-weldable sheet 314, on the side opposite the first metal sheet 310. In many instances, this second sheet 312 is serving only as a fastener, so it may be specifically sized and shaped for that purpose, such as by centering the second sheet 312 over the one or more holes 320. In some instances, for example, the second sheet may be a circular disc, centered over a hole in the non-weldable sheet. A variety of techniques, including for illustrative purposes and not for limitation, clamping or adhesive, may be used to hold either the first 310 and/or the second metal sheet 312 to the non-weldable sheet 314.

Accordingly, in other exemplary embodiments, it will be recognized that the sheets 310, 312 may not be joined along their respective edges (i.e., a more central portion of one or both sheets may be joined). However, in yet another exemplary embodiment, an edge of one or both sheets 310, 312 may be directly over one or more holes 320.

When a vaporizing foil actuator 316 is used adjacent to the second metal sheet 312, the non-weldable sheet 314 operates as a spacer at the hole formed therein, and a portion of the second sheet 312 is deformed into the hole 320, where it impacts the first metal sheet 310 to form a bond.

Figure 8:
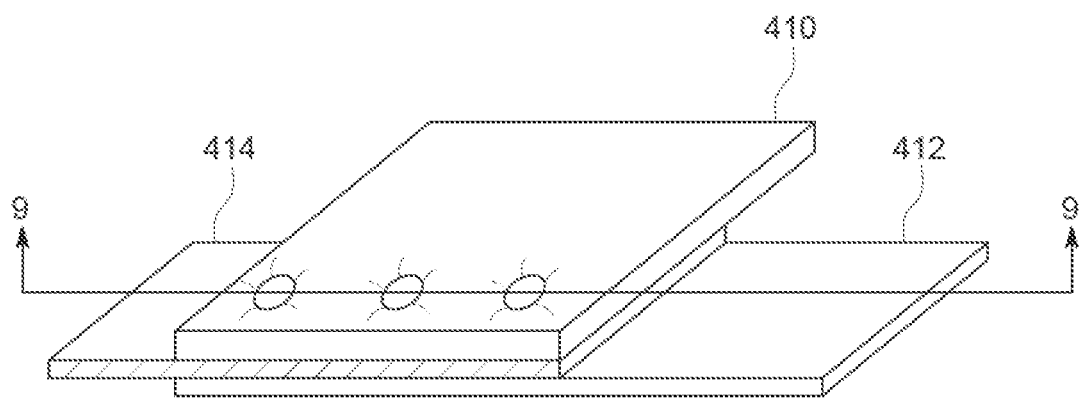
FIG. 8 is a schematic of an exemplary embodiment of a vaporizing foil actuation system comprising an intermediate body that has multiple holes to facilitate welding, which indicates a cross-section line 9-9, wherein the intermediate body is not amenable to welding (a vaporizing foil actuator is not shown for clarity)
Figure 9:
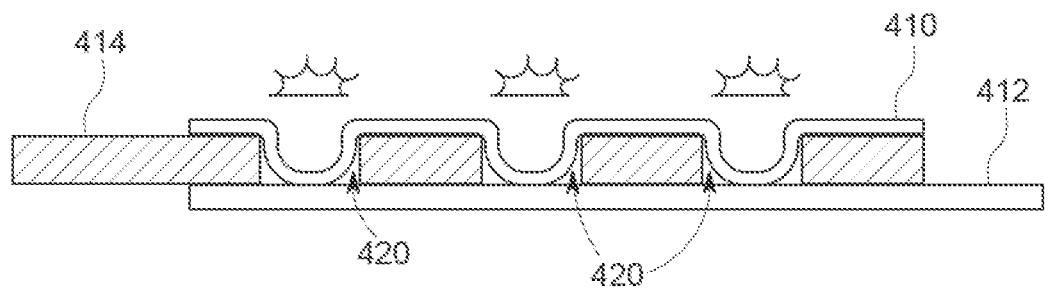
FIG. 9 is a cross-sectional schematic of the vaporizing foil actuation system of FIG. 8 (showing vaporizing foil actuators).

Similarly, such as shown in the example shown in FIGS. 8 and 9, when more than one hole 420 is provided in the non-weldable sheet 414 for joining the first metal sheet 410 to the second metal sheet 412, either a single elongated second metal sheet may be used or separate second metal sheets may be used. Furthermore, either a single first metal sheet or separate first metal sheets may be used. The exact arrangement will, of course, often be determined by the structural requirements of the situation.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for joining dissimilar metals, said method comprising the steps of:
   providing a first metal, a second metal that is dissimilar to said first metal, and an intermediate body comprised of a carbon fiber composite and having at least one hole such that said first metal and said second metal are positioned on opposite sides of said intermediate body and over said at least one hole; and
   driving at least a portion of said second metal into said hole such that said second metal is welded to said first metal, and said intermediate body is trapped between said first metal and said second metal.

2. The method of claim 1 further comprising the step of providing a vaporizing foil actuator that drives said portion of said second metal into said hole such that said second metal is joined to said first metal.

3. The method of claim 1, wherein said intermediate body has a plurality of said holes such that said second metal is welded to said first metal through each of said holes.

\* \* \* \* \*